United States Patent Office 2,955,899
Patented Oct. 11, 1960

2,955,899

TRIARYLMETHANE DYESTUFFS AND PROCESS OF DYEING FIBROUS MATERIAL

Donald L. Bailey, Snyder, and Ronald M. Pike, Grand Island, N.Y., assignors to Union Carbide Corporation, a corporation of New York No Drawing. Filed Apr. 29, 1957, Ser. No. 655,503

20 Claims. (Cl. 8—8)

This invention relates to silicon-containing dyestuffs as new compositions of matter, and to processes for producing them. More particularly, this invention is concerned with silicon-containing triarylmethane dyestuffs.

The triarylmethane dyestuffs of the present invention contain the unit represented by the general formula:

$$\left[-\text{Ar}-\overset{X}{\underset{|}{N}}-C_aH_{2a}-Si\equiv\right]$$

wherein Ar represents an arylene radical such as a phenylene or naphthylene radical, as well as substituted phenylene or naphthylene radicals such as tolylene, methylnaphthylene, sulfonaphthylene, and the like; X represents a hydrogen atom or an alkyl radical such as methyl, ethyl, propyl and the like, or a $-C_aH_{2a}-Si\equiv$ radical; and ($a$) is an integer having a value of at least 3 and preferably of from 3 to about 5.

The triarylmethane dyestuffs of this invention are members either of the Malachite Green Series (containing two amino groups) or of the Rosaniline Series (containing three amino groups) as classified in "The Chemistry of Synthetic Dyes," K. Venkataraman, Academic Press Inc., N.Y., 1952, vol. II, p. 709. A large number of arylmethane dyestuffs have been produced in the past, but none, to our knowledge, have been produced having a silicon-containing group in the molecule.

The triarylmethane dyestuffs herein disclosed and claimed contain units which can be represented by the following general formulae:

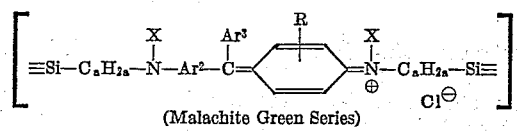

(Malachite Green Series)

and

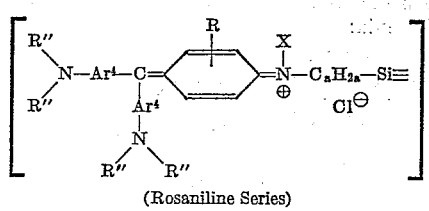

(Rosaniline Series)

wherein X and ($a$) have the same meanings as hereinbefore indicated; $Ar^2$ represents a phenylene radical and including alkyl and alkoxy substituted phenylene radicals such as tolylene, methoxyphenylene and the like; $Ar^3$ represents a phenyl radical and including substituted phenyl radicals such as sulfo, chloro, nitro, alkyl, alkoxy, hydroxy, and the like substituted phenyl radicals; $Ar^4$ represents a phenylene radical; R represents a hydrogen atom, an alkyl radical such as methyl, ethyl, propyl and the like, or an alkoxy radical such as methoxy, ethoxy, propoxy and the like; and R" represents a hydrogen atom, or an alkyl radical, or an aryl radical. It is understood that resonance in the molecule does not limit the location of the

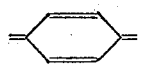

radical as indicated above, but that it may also be located at the $Ar^2$ and $Ar^4$ nuclei. These dyestuffs can be produced by the reaction of an arylaminoalkylsilane with a carbonyl-containing compound such as an arylaldehyde or a 4,4'-diaminodiaryl ketone.

The triarylmethane dyestuffs of this invention belonging to the Malachite Green Series can be produced by condensing an aryl aldehyde such as benzaldehyde or a substituted benzaldehyde such as nitrobenzaldehyde or methylbenzaldehyde with an arylaminoalkylsilane which can be represented by the following general formula:

$$Ar^1-\overset{X'}{\underset{|}{N}}-C_aH_{2a}-\overset{V_n}{\underset{|}{Si}}-Y_{3-n}$$

wherein V represents an alkyl radical, preferably containing from 1 to about 5 carbon atoms; $Ar^1$ represents an aryl radical or a substituted aryl radical as, for example, phenyl or naphthyl radicals, or lower alkyl, alkoxy, nitro, halogen, sulfo, and the like substituted phenyl or naphthyl radicals, and wherein the para position is unsubstituted and reactive; X' represents a hydrogen atom, or an alkyl radical, or an $$-C_aH_{2a}-\overset{V_n}{\underset{|}{Si}}-Y_{3-n}$$

radical; Y represents an alkoxy radical such as methoxy, ethoxy or propoxy; ($a$) is an integer having a value of at least 3; and ($n$) is an integer having a value of from 0 to 3. The condensation of aryl aldehyde and arylaminoalkylsilane is best carried out by heating and stirring the reaction mixture of starting materials at a temperature of about 100° C. in the presence of a condensation catalyst such as zinc chloride, hydrochloric acid, or sulfuric acid.

When the starting arylaminoalkylsilane is non-functional, the triarylmethane silane dyestuffs produced can be represented by the general formula:

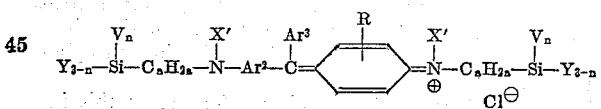

Whereas, when the starting arylaminoalkylsilane is functional, then the triarylmethane siloxane dyestuffs produced contain units which can be represented by the general formula:

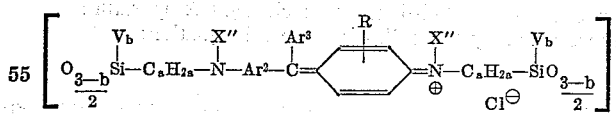

wherein X" represents a hydrogen atom, or an alkyl radical, or

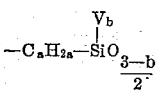

radicals; and ($b$) is an integer having a value of 0 to 2. In the condensation, two moles of arylaminoalkylsilane are reacted with one mole of aryl aldehyde to form the leuco triarylmethane dyestuff; which is then isolated from the reaction mixture and oxidized with an oxidizing agent, such as lead peroxide, by methods well known in dyestuff technology.

The triarylmethane dyestuffs of this invention which belong to the Rosaniline Series may be produced by condensing one mole of an arylaminoalkylsilane represented by the general formula:

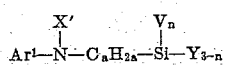

with one mole of 4,4'-diaminodiaryl ketone, including substituted diaminodiaryl ketones, which can be represented by the following general formula:

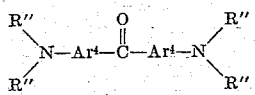

wherein R″ and Ar⁴ have the meanings as hereinbefore indicated, in the presence of about one mole of a condensation agent such as phosphorous oxychloride. The reaction mixture of diaryldiamine, silane and condensation catalyst is heated to the boiling point of the mixture and maintained at a slight reflux. When the starting arylaminoalkylsilane is non-functional, the triarylmethane silane dyestuffs, of the Rosaniline Series, produced can be represented by the general formula:

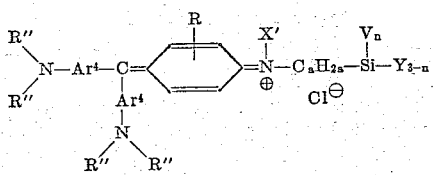

whereas, when the starting arylaminoalkylsilane is functional, then the triarylmethane dyestuffs produced contain units which can be represented by the general formula:

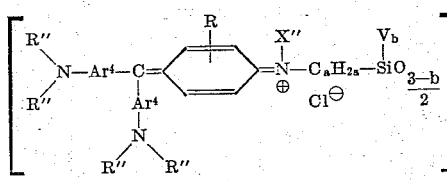

Illustrative of the aryl aldehydes which are suitable for use in this invention are benzaldehyde, 2-chlorobenzaldehyde, 2,5-dichlorobenzaldehyde, 2-methylbenzaldehyde-5-carboxylic acid, 2-nitro-5-methylbenzaldehyde, benzaldehyde-2-sulfonic acid, 3-hydroxybenzaldehyde and the like. Among the suitable 4,4'-diaminodiaryl ketones are 4,4'-diaminodiphenylketone, 4,4'-dimethylaminobenzophenone, 4,4'-diethylaminobenzophenone, 4,4'-methylaminobenzophenone, 4-amino-4'-dimethylaminobenzophenone, and the like.

The arylaminoalkylsilanes suitable for use in this invention, and processes for their preparation, are the subject matter of our copending patent application, Serial No. 615,463, filed October 12, 1956. These silane intermediates can be produced by reacting an arylamine with an omega-haloalkylsilane at an elevated temperature, as represented by the following general equation:

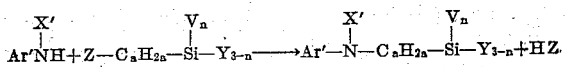

wherein Ar′, X′, V, Y, (a) and (n) have the same meanings as hereinbefore indicated, and Z represents a halogen atom. For example, the reaction of molar equivalents of gamma-chloropropyltriethoxysilane with aniline at about 150° C. under an inert gas atmosphere produced N-(gamma-triethoxysilylpropyl)-aniline. By using two molar equivalents of gamma-chloro-propyltriethoxysilane with one mole of aniline there is produced N,N-di-(gamma-triethoxysilylpropyl)-aniline.

Illustrative of the arylaminoalkylsilanes which can be used as starting materials in this invention are inter alia: N-(gamma-trimethylsilylpropyl)-aniline, N-methyl-N-(gamma-trimethylsilylpropyl)-aniline, N,N-di-(gamma-trimethylsilylpropyl)-aniline, N-(delta-trimethylsilylbutyl)-2-methoxyaniline, N-(gamma-triethylsilylpropyl)-2,5-dichloroaniline, N-(gamma-trimethylsilylpropyl)-3-nitroaniline, N-(gamma-triethoxysilylpropyl)-aniline, N-methyl-N-(gamma-triethoxysilylpropyl)-aniline, N,N-di-(gamma-triethoxysilylpropyl)-aniline, N-(gamma-triethoxysilylpropyl)-2-methoxyaniline, N-(gamma-triethoxysilylpropyl)-2,5-dichloroaniline, N-(gamma-triethoxysilylpropyl)-3-nitroaniline, N-(gamma-methyldiethoxysilylpropyl)-aniline, N-(gamma-phenylmethylethoxysilylpropyl)-2-methylaniline, N-(gamma-phenoxydiethoxysilylpropyl)-aniline and the like.

The triarylmethane dyestuffs of this invention are substantive to fibrous materials such as the natural fibers silk, wool and cotton, and the synthetic fibers nylon, acetate, viscose, Dynel, Acrilan, and the like. In addition, they are characterized by the very useful property of dyeing glass cloth and silica from aqueous dyebath solutions, giving dyeings of good wash and light fastness properties. The polymeric products are also suitable as pigments because of their insolubility in the common solvents; and in the preparation of ink compositions.

The following examples further serve to illustrate this invention:

Example 1

In a 100 ml. three-necked flask equipped with a stirrer, and a condenser surmounted by a calcium chloride tube there were placed 2.68 g. of 4,4'-dimethylaminobenzophenone, 3.11 g. of N-methyl-N-(gamma-triethoxysilylpropyl)-aniline, 15 ml. of toluene and 1.54 g. of phosphorous oxychloride. The mixture was heated to the boiling point and maintained at a slight reflux for about ¾ hour. The toluene was then distilled off and the deep blue-violet residue was cooled to room temperature and washed with about 10 ml. of 50 percent sodium hydroxide solution to remove the phosphate salts formed during the reaction. The siloxane triarylmethane dyestuff was filtered, washed with water until the washings were neutral and then dried in a vacuum oven at 55° C. for about 16 hours. The yield was 4.35 g. A portion was purified for microanalysis by dissolving in methanol, filtering to remove insolubles, precipitating with base and washing the filtered product with distilled water until neutral. The blue dyestuff contained units which correspond to the formula:

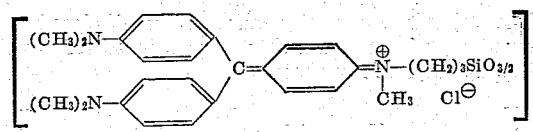

*Microanalysis.*—Calcd. for $C_{27}H_{33}O_{3/2}N_3ClSi$: N, 8.65; Si, 5.76. Found: N, 9.0; Si, 5.6.

By substituting N-(gamma-trimethylsilylpropyl)-aniline for N-methyl-N-(gamma-triethoxysilylpropyl)-aniline one can obtain the silane triarylmethane dyestuff represented by the formula:

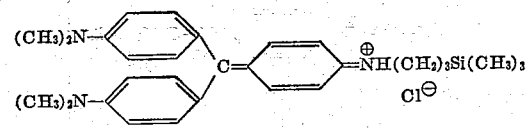

Example 2

There were charged 2.65 g. of benzaldehyde, 15.4 g. of N-methyl-N-(gamma-triethoxysilylpropyl)-aniline and 4 g. of freshly fused and ground zinc chloride to the apparatus described in Example 1. The reaction mixture was heated to 100° C. and stirred at this temperature for about 4 hours. Added 30 ml. of warm water to the reaction mixture, extracted the green oil which separated out with methanol and then dissolved in ether. Evaporation of the ether yielded an oily material which precipitated out as an insoluble polymeric product upon addition of 20 ml. of 5 percent aqueous hydrochloric acid solution to the oil. This solid was filtered off, washed on the funnel with methanol and then ether and finally dried at room temperature. The brownish leuco siloxane triarylmethane weighed 7.5 g.

Three grams of the above crude material was added to a mixture of 10 ml. of 37 percent hydrochloric acid, 50 ml. of water and 7 ml. of acetic acid. To this slurry at about 5° C. there was added with stirring a suspension of 1.95 g. of lead peroxide suspended in 5 ml. of water, and the oxidation was permitted to proceed at about 10° C. for about 1½ hours. The light green oxidized siloxane triarylmethane dyestuff was filtered off, washed on the funnel with about 15 ml. of 5 percent hydrochloric acid, then with about 15 ml. of 5 percent sodium hydroxide solution, followed in order by water, methanol and ether. Yield was 2.5 g. of green dyestuff, which was insoluble in all common solvents, having units represented by the following formula:

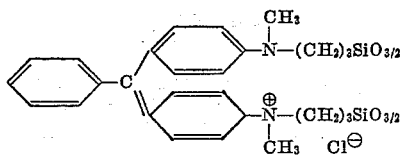

*Microanalysis.*—Calcd. for $C_{27}H_{31}O_3N_2ClSi_2$: Si, 10.7. Found: Si, 10.2.

By substitution of N-(gamma-trimethylsilylpropyl)-aniline for N-methyl-N-(gamma-triethoxysilylpropyl)-aniline one can obtain the silane triarylmethane dyestuff represented by the formula:

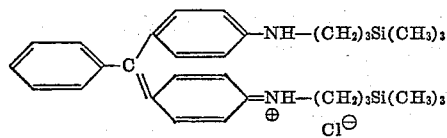

*Example 3*

There was dissolved 10 g. of beta-phenylethylpolysiloxane sulfonic acid in about 10 ml. of water, and the pH was made just alkaline to phenolphthalein indicator with dilute sodium hydroxide. Added 69.4 g. of a 22.7 percent silica solution to the solution, heated at 100° C. for about ½ hour and then added about 125 ml. of water. A solution of about 0.2 g. of the siloxane triarylmethane dyestuff from Example 1 in about 40 ml. of 18 percent aqueous hydrochloric acid was prepared and this was added to the above silicate solution at about 25° C. Then added 10 ml. of 37 percent hydrochloric acid and heated to about 90° C.; a green gel quickly formed. The gel was washed with water, whereupon the color became blue-green, filtered and dried at 110° C. overnight. The dyed silica weighed 30 g. and was suitable for use as an indicator and as a colored filler for molding compositions.

*Example 4*

There was dissolved 0.1 g. of the siloxane triphenylmethane dyestuff of Example 1 in 3 g. of glycerine at room temperature to produce a blue solution. A 0.4 ml. portion of this solution was added to 3 ml. of water, and this ink formulation was used to write on ruled paper and cotton cloth. After drying, the ink could not be smudged by rubbing with wet or dry fingers. Suspension of the written paper and cloth in tap water for two days showed no loss in legibility or clarity of the writing. Suspension of the written ruled paper in a 50–50 methanol water solution for 24 hours showed no effect on the writing, but the ruled lines on the paper were completely removed.

What is claimed is:

1. Silicon-containing triarylmethane dyestuffs containing the unit represented by the general formula:

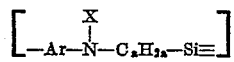

wherein Ar represents a member selected from the group consisting of arylene radicals and substituted arylene radicals; X represents a member selected from the group consisting of hydrogen atoms, alkyl radicals and $$—C_aH_{2a}—Si≡$$

radicals; and ($a$) is an integer having a value of at least 3.

2. Silicon-containing triarylmethane dyestuffs containing the unit represented by the general formula:

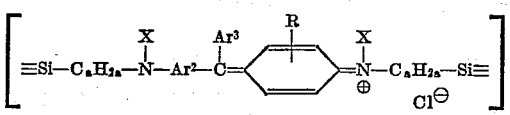

wherein $Ar^2$ represents a member selected from the group consisting of phenylene radicals and alkyl and alkoxy substituted phenylene radicals; $Ar^3$ represents a member selected from the group consisting of phenyl radicals and substituted phenyl radicals; R represents a member selected from the group consisting of hydrogen atoms, alkyl radicals and alkoxy radicals; X represents a member selected from the group consisting of hydrogen atoms, alkyl radicals and $—C_aH_{2a}—Si≡$ radicals; and ($a$) represents an integer having a value of at least 3.

3. Silane triarylmethane dyestuffs represented by the general formula:

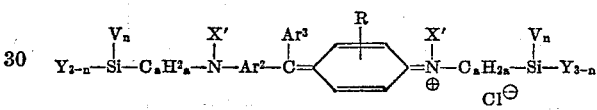

wherein $Ar^2$ represents a member selected from the group consisting of phenylene radicals and alkyl and alkoxy substituted phenylene radicals; $Ar^3$ represents a member selected from the group consisting of phenyl radicals and substituted phenyl radicals; R represents a member selected from the group consisting of hydrogen atoms, alkyl radicals and alkoxy radicals; X' represents a member selected from the group consisting of hydrogen atoms, alkyl radicals, and $$—C_aH_{2a}—Si—Y_{3-n}$$

radicals; V represents a member selected from the group consisting of alkyl radicals; Y represents a member selected from the group consisting of alkoxy radicals; ($a$) represents an integer having a value of at least 3; and ($n$) is an integer having a value of from 0 to 3.

4. Siloxane triarylmethane dyestuffs containing the unit represented by the general formula:

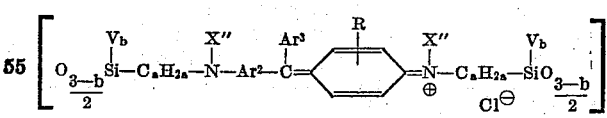

wherein $Ar^2$ represents a member selected from the group consisting of phenylene radicals and alkyl and alkoxy substituted phenylene radicals; $Ar^3$ represents a member selected from the group consisting of phenyl radicals and substituted phenyl radicals; R represents a member selected from the group consisting of hydrogen atoms, alkyl radicals and alkoxy radicals; X'' represents a member selected from the group consisting of hydrogen atoms, alkyl radicals and

radicals; V represents a member selected from the group consisting of alkyl radicals; ($a$) is an integer having a value of at least 3; and ($b$) is an integer having a value of 0 to 2.

5. The silane triarylmethane dyestuff:

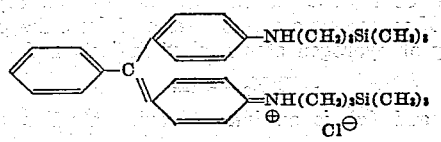

6. The siloxane triarylmethane dyestuffs containing the unit represented by the formula:

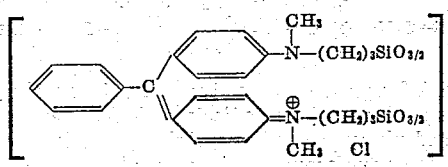

7. Silicon-containing triarylmethane dyestuffs containing the unit represented by the general formula:

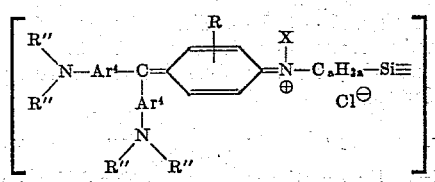

wherein $Ar^4$ represents a phenylene radical; R represents a member selected from the group consisting of hydrogen atoms, alkyl radicals and alkoxy radicals; R'' represents a member selected from the group consisting of hydrogen atoms, alkyl radicals and aryl radicals; X represents a member selected from the group consisting of hydrogen atoms, alkyl radicals and $—C_aH_{2a}—Si\equiv$ radicals; and ($a$) is an integer having a value of at least 3.

8. Silane triarylmethane dyestuffs represented by the general formula:

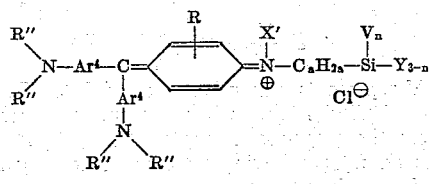

wherein $Ar^4$ represents a phenylene radical; R represents a member selected from the group consisting of hydrogen atoms, alkyl radicals and alkoxy radicals; R'' represents a member selected from the group consisting of hydrogen atoms, alkyl radicals and aryl radicals; X' represents a member selected from the group consisting of hydrogen atoms, alkyl radicals, and

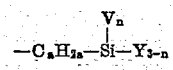

radicals; V represents a member selected from the group consisting of alkyl radicals; Y represents a member selected from the group consisting of alkoxy radicals; ($a$) represents an integer having a value of at least 3; and ($n$) is an integer having a value of from 0 to 3.

9. Siloxane triarylmethane dyestuffs containing units represented by the general formula:

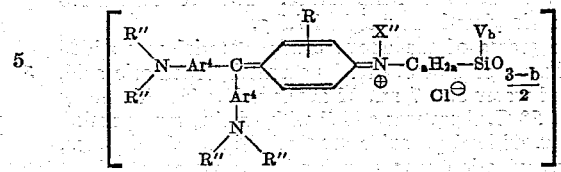

wherein $Ar^4$ represents a phenylene radical; R represents a member selected from the group consisting of hydrogen atoms, alkyl radicals and alkoxy radicals; R'' represents a member selected from the group consisting of hydrogen atoms, alkyl radicals and aryl radicals; X'' represents a member selected from the group consisting of hydrogen atoms, alkyl radicals and

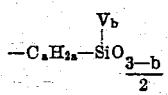

radicals; V represents a member selected from the group consisting of alkyl radicals; ($a$) is an integer having a value of at least 3; and ($b$) is an integer having a value of 0 to 2.

10. The silane triarylmethane dyestuff:

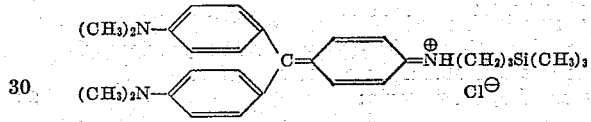

11. The siloxane triarylmethane dyestuffs containing the unit represented by the formula:

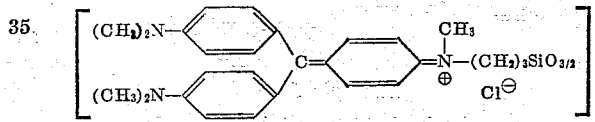

12. The method of dyeing fibrous material, which comprises exposing said fibrous material to a dyebath containing a silicon-containing triarylmethane dyestuff of claim 2 at an elevated temperature, rinsing, and drying.

13. The method of dyeing fibrous material, which comprises exposing said fibrous material to a dyebath containing a silicon-containing triarylmethane dyestuff of claim 7 at an elevated temperature, rinsing, and drying.

14. A fiber dyed with a silicon-containing triarylmethane dyestuff of claim 2.

15. A fiber dyed with a silicon-containing triarylmethane dyestuff of claim 7.

16. Glass cloth dyed with a silicon-containing triarylmethane dyestuff of claim 2.

17. Glass cloth dyed with a silicon-containing triarylmethane dyestuff of claim 7.

18. Silica dyed with the silicon-containing triarylmethane dyestuffs of claim 2.

19. Silica dyed with the silicon-containing triarylmethane dyestuffs of claim 7.

20. Silica dyed with the silicon-containing triarylmethane dyestuffs of claim 11.

References Cited in the file of this patent
UNITED STATES PATENTS

| | | |
|---|---|---|
| 2,359,733 | Grant | Oct. 10, 1944 |
| 2,715,133 | Speier | Aug. 9, 1955 |